United States Patent
BenHanokh et al.

(10) Patent No.: US 11,481,143 B2
(45) Date of Patent: Oct. 25, 2022

(54) METADATA MANAGEMENT FOR EXTENT-BASED STORAGE SYSTEM

(71) Applicant: RED HAT, INC., Raleigh, NC (US)

(72) Inventors: Gabriel Zvi BenHanokh, Tel-Aviv (IL); Joshua Durgin, Canyon, CA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 17/093,743

(22) Filed: Nov. 10, 2020

(65) Prior Publication Data
US 2022/0147265 A1    May 12, 2022

(51) Int. Cl.
  *G06F 12/00* (2006.01)
  *G06F 3/06* (2006.01)
  (Continued)

(52) U.S. Cl.
  CPC .......... *G06F 3/0655* (2013.01); *G06F 3/0604* (2013.01); *G06F 3/0679* (2013.01);
  (Continued)

(58) Field of Classification Search
  CPC ......... G06F 12/121–123; G06F 12/127; G06F 12/0871; G06F 3/0655; G06F 3/0604
  See application file for complete search history.

(56) References Cited

U.S. PATENT DOCUMENTS 5,822,759 A  * 10/1998  Treynor ................. G06F 12/122
                                                         711/134
6,012,126 A  *  1/2000  Aggarwal ........... G06F 12/0866
                                                         711/134
(Continued)

FOREIGN PATENT DOCUMENTS

CN    105975402 B    1/2019
CN    111641700 A    9/2020

OTHER PUBLICATIONS

Ma, Tinghuai, et al., "An Improved Web Cache Replacement Algorithm Based on Weighting and Cost," School of Computer Software, Nanjing University of Information Science and Technology, China; CICAEET, Jiangsu Engineering Centre of Network Monitoring, Nanjing University of Information Science and Technology; National Meteorological Information Center; Computer Science Department, College of Computerand Information Sciences, https://ieeexplore.ieee.org/document/8344541?denied=.
(Continued)

*Primary Examiner* — Reginald G Bragdon
*Assistant Examiner* — Michael L Westbrook
(74) *Attorney, Agent, or Firm* — Kilpatrick Townsend & Stockton LLP

(57) ABSTRACT

Metadata of extent-based storage systems can be managed. For example, a computing device can store a first metadata object and a second metadata object in a first memory device. The first metadata object can specify locations of a first set of extents corresponding to a first data unit stored in a second memory device. The second metadata object can specify locations of a second set of extents corresponding to a second data unit stored in the second memory device. The computing device can determine that a first size of the first metadata object is smaller than a second size of the second metadata object. The computing device can remove the second metadata object from the first memory device based on determining that the first size is less than the second size.

20 Claims, 4 Drawing Sheets

(51) Int. Cl.
  *G06F 16/28* (2019.01)
  *G06F 12/121* (2016.01)
  *G06F 12/122* (2016.01)
  *G06F 12/123* (2016.01)
  *G06F 12/0871* (2016.01)
  *G06F 12/127* (2016.01)

(52) U.S. Cl.
  CPC ........ *G06F 12/0871* (2013.01); *G06F 12/121* (2013.01); *G06F 12/122* (2013.01); *G06F 12/123* (2013.01); *G06F 12/127* (2013.01); *G06F 16/285* (2019.01)

(56) References Cited

U.S. PATENT DOCUMENTS

| | | | | |
|---|---|---|---|---|
| 6,742,084 | B1* | 5/2004 | Defouw | G06F 12/122 711/134 |
| 7,076,611 | B2 | 7/2006 | Steere et al. | |
| 9,032,151 | B2 | 5/2015 | Iyigun et al. | |
| 9,992,298 | B2 | 6/2018 | Baldwin et al. | |
| 10,482,062 | B1* | 11/2019 | Muniswamy Reddy | G06F 3/061 |
| 2006/0143392 | A1* | 6/2006 | Petev | G06F 12/123 711/E12.072 |

OTHER PUBLICATIONS

Beckmann, N., et al., "LHD: Improving Cache Hit Rate by Maximizing Hit Density," Carnegie Mellon University; University of Pennsylvania; Stanford University/Barracuda Networks, Apr. 9-11, 2018, https://www.usenix.org/system/files/conference/nsdi18/nsdi18-beckmann.pdf.

Gu, P., et al., "A Novel Weighted-Graph-Based Grouping Algorithm for Metadata Prefetching," Microsoft Corporation; University of Central Florida; University of Maine; University of Nebraska—Lincoln, 2010, https://www.researchgate.net/publication/220330801_A_Novel_Weighted-Graph-Based_Grouping_Algorithm_for_Metadata_Prefetching.

* cited by examiner

METADATA MANAGEMENT FOR EXTENT-BASED STORAGE SYSTEM

TECHNICAL FIELD

The present disclosure relates generally to extent-based storage systems. More specifically, but not by way of limitation, this disclosure relates to metadata management in extent-based storage systems.

BACKGROUND

In typical block-based storage systems, a data unit (e.g., file) can be stored in blocks on a storage device. A corresponding metadata object can be stored in a cache memory for use in rapidly retrieving the data unit. The metadata object can indicate locations (e.g., disk addresses) of the underlying storage blocks in which the data unit is stored. In the metadata object, there can be a separate metadata entry indicating a location of each block of the data unit. For example, a file stored across twenty storage blocks can have twenty metadata entries in the corresponding metadata object indicating the locations of the twenty blocks.

An extent-based storage system is a type of block-based storage system in which data units are stored in extents formed from multiple storage blocks. Each extent spans multiple consecutive storage blocks, where each block is a predefined number of bytes in size. In extent-based storage systems, the metadata object stored in the cache memory can designate one or more extents in which the data unit is stored on the storage device. For example, a file stored in twenty consecutive blocks has one metadata entry specifying a single extent spanning all twenty blocks in which the data unit is stored. If a data unit is fragmented and stored in multiple non-contiguous extents within the filesystem, there can be a separate metadata entry in the metadata object for each extent.

DETAILED DESCRIPTION

Figure 1:
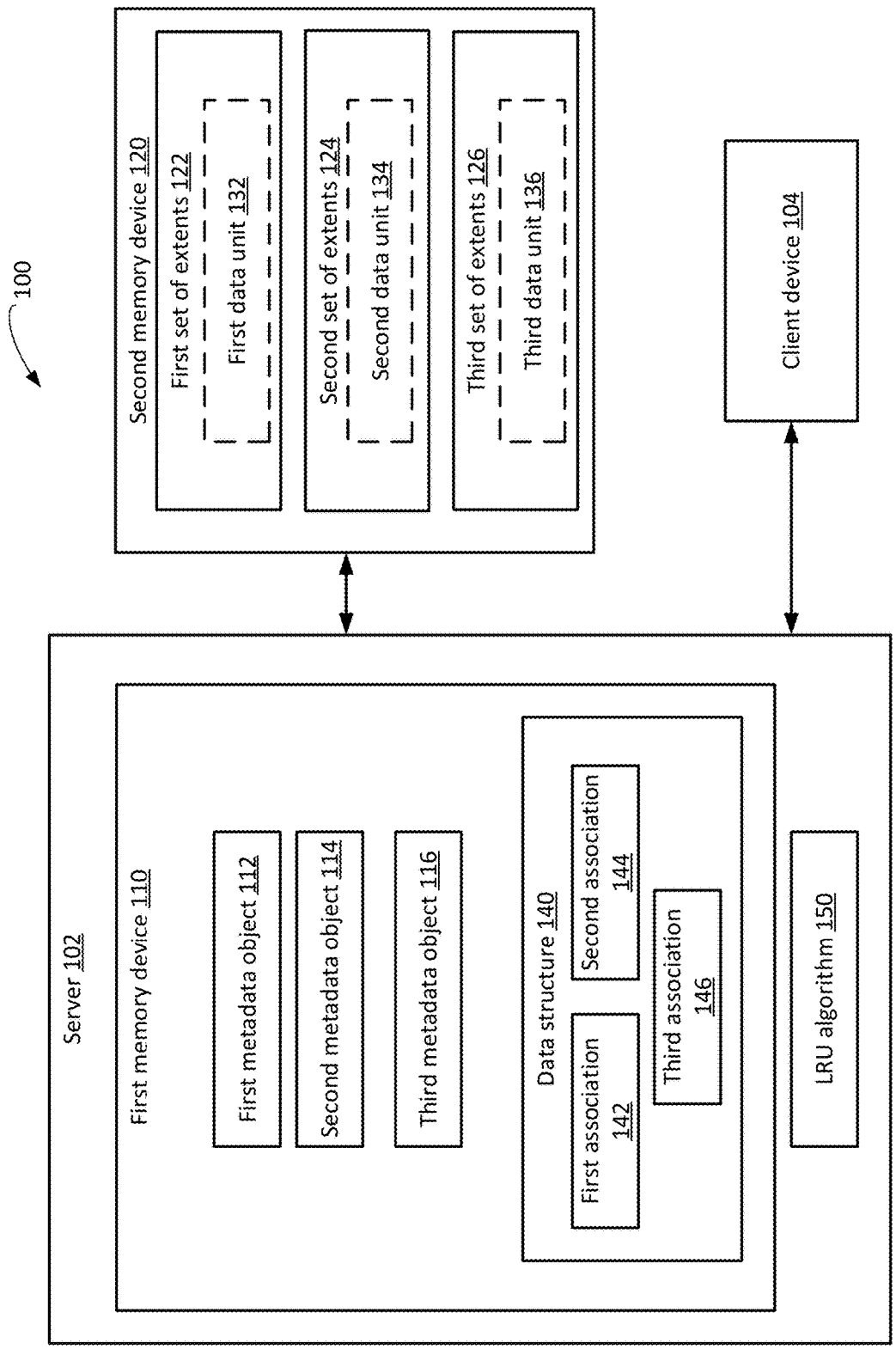
FIG. 1 is a block diagram of an example of a system for implementing metadata management in an extent-based storage system according to some aspects of the present disclosure.

Extent-based storage systems can store metadata objects in a cache memory, where the metadata objects describe locations of extents corresponding to data units stored on a storage device such as a hard disk or solid-state drive. The cache memory has a predefined allotment of space for the metadata objects, and once the allotment is reached, metadata objects can be removed to make space for additional reads. One approach to removing such metadata objects involves executing a least recently used (LRU) algorithm, which can remove a metadata object that was least recently accessed among all of the metadata objects stored in the cache memory. But a typical LRU algorithm treats all metadata objects equally, which can lead to inefficient usage of cache memory space and undesirable latency in certain circumstances.

For example, a cache memory may be storing a first metadata object corresponding to a first data unit and a second metadata object corresponding to a second data unit. The first metadata object may be a smaller size than a second metadata object in the cache memory, even though the first data unit may be of the same size on the storage device as the second data unit. This may occur because the second data unit is fragmented across multiple extents on the storage device, and consequently more metadata information is included in the second metadata object than in the first metadata object. In this scenario, the first metadata object consumes less space in the cache memory than the second metadata object to describe the same amount of data in the storage device. When determining which metadata objects to remove from the cache memory, the LRU algorithm only considers which metadata object was least recently accessed. If the first metadata object was least recently accessed, then the LRU algorithm will determine the first metadata object is to be removed from the first memory device. As a result, the smaller metadata object that consumes less of the cache memory space is removed from the cache memory, despite both metadata objects describing the same amount of data on the storage device. By deleting the smaller metadata object rather than the larger metadata object, the space in the cache memory is being used inefficiently because more cache memory is being sacrificed to describe the same amount of data stored in the storage device. This can result in fewer metadata objects being able to be stored in the cache memory than if the larger metadata object was removed instead, which is a suboptimal use of cache memory that can increase the latency of the system.

Some examples of the present disclosure overcome one or more of the abovementioned problems by employing a more sophisticated approach to removing metadata objects from the cache memory, in which the densities of the metadata objects are used to determine which metadata object to remove. The "density" of a metadata object is a ratio of (i) the size of a metadata object in cache memory to (ii) the size of a corresponding data unit in a storage device. For example, the system can determine a size of a metadata object in cache memory, where the metadata object is associated with a data unit in a storage device. The system can also determine the size of the data unit. The system can then determine the ratio between the size of the metadata object size and the size of the data unit. This ratio can be referred to as the "density" of the metadata object. Metadata objects for data units that span more non-contiguous extents on the storage device can be less dense than metadata objects for data units of the same size that span fewer non-contiguous extents on the storage device. This is because metadata objects describing more non-contiguous extents will include more extent-location information and therefore be larger in size than metadata objects describing fewer non-contiguous extents. The system can use such densities to determine which metadata objects to remove. For example, the system can prioritize removing less-dense metadata objects over more-dense metadata objects.

In some examples, the system can determine which metadata objects to remove from the cache memory using a modified least recently used (LRU) algorithm or another type of algorithm that considers the densities of the metadata objections. For example, the system can categorize the metadata objects by density. The system can then then apply the algorithm to one or more of the categories (e.g., the category associated with the least dense metadata-objects), to determine which metadata objects to remove from the cache memory. Larger metadata objects describing smaller portions of the data can be less dense metadata objects that can then be removed, which can free up space in the cache memory for storing additional metadata objects describing a greater portion of the data in the storage device.

As a more specific example, a computing device can store a first metadata object in a cache memory. The first metadata object can specify locations of a first number of extents corresponding to a first data unit stored on a solid-state drive. For example, the first metadata object can be twelve bytes in size and may correspond to a first data unit that is four megabytes in size. The cache memory can also store a second metadata object specifying locations of a second number of extents corresponding to a second data unit stored on the solid-state drive. The second metadata object can be twelve kilobytes in size and may correspond to a second data unit that is four megabytes in size. Since both metadata objects correspond to data units of the same size (four megabytes), and the first metadata object is one-thousand times smaller in size than the second metadata object, the first metadata object can be considered to be one-thousand times more dense than the second metadata object. Since the first metadata object is significantly more dense than the second metadata object, it may be desirable to remove the second metadata object from the cache memory (e.g., rather than removing the first metadata object from the cache memory), so that the space can be better allocated to storing a larger number of smaller metadata objects corresponding to a larger number of data units. This may make it faster for the computing device to retrieve more data units in response to read requests than would otherwise be possible if the same space was taken up by fewer metadata objects that are less dense.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for implementing metadata management in an extent-based storage system according to some aspects of the present disclosure. The system can include a server 102 having a first memory device 110. Examples of the first memory device 110 can include a cache memory, random access memory (RAM), flash memory, etc. The system can additionally include a second memory device 120. Examples of the second memory device 120 can include a hard disk, solid state drive (SSD), etc. While some examples of the first memory device 110 and the second memory device 120 are provided, the first memory device 110 may be any type of memory device that is faster than the second memory device 120. A client device 104 can be in communication with the server 102. Examples of the client device 104 can include a laptop computer, desktop computer, server, mobile phone, etc.

In some examples, the server 102 can store a first metadata object 112 and a second metadata object 114 in the first memory device 110. The server 102 stores the first metadata object 112 and the second metadata object 114 based on read requests for a first data unit 132 and a second data unit 134, respectively, received from the client device 104. The first metadata object 112 can be configured to provide location information for retrieving the first data unit 132 from the second memory device 120. For example, the first metadata object 112 can specify locations of a first set of extents 122 corresponding to the first data unit 132 stored in the second memory device 120. Similarly, the second metadata object 114 can be configured to provide location information for retrieving the second data unit 134 from the second memory device 120. For example, the second metadata object 114 can specify locations of a second set of extents 124 corresponding to the second data unit 134 stored in the second memory device 120. The system 100 can use the first metadata object 112 to locate and retrieve the first data unit 132 from the second memory device 120 in response to a read request for the first data unit 132. Similarly, the system can use the second metadata object 114 to locate and retrieve the second data unit 134 from the second memory device 120 in response to a read request for the second data unit 134.

In some examples, the first set of extents 122 can include fewer extents than the second set of extents 124. This may occur because the second data unit 134 is fragmented across multiple non-contiguous extents of the second memory device 120, whereas the first data unit 132 may not be fragmented or may be less fragmented than the second data unit 134. As a result, the first metadata object 112 may describe a smaller number of extents than the second metadata object 114, and therefore the first metadata object 112 may be smaller in size than the second metadata object 114.

In some examples, the server 102 can determine which metadata object to remove from the first memory device 110 based on densities of the metadata objects. For example, the first metadata object 112 can be one-hundred bytes in size and may correspond to a first data unit 132 that is two megabytes in size. And the second metadata object 114 can be one kilobyte in size and may correspond to a second data unit 134 that is two megabytes in size. In such circumstances, the first metadata object 112 can be said to be ten times more dense than the second metadata object 114. In general, metadata objects for data units that span more non-contiguous extents can be less dense than metadata objects for data units of the same size that span fewer non-contiguous extents. This is because metadata objects describing more non-contiguous extents will include more location information and therefore be larger in size than metadata objects describing fewer non-contiguous extents. It may be desirable to remove less dense metadata objects from the first memory device 110, so that the same space can be better allocated to storing a larger number of smaller metadata objects corresponding to a larger number of data units. This may make it faster for the system 100 to retrieve more data units in response to read requests from the client device 104 than would otherwise be possible if the same space was taken up by fewer metadata objects that are less dense.

More specifically, the server 102 can determine that the first memory device 110 is full or has reached a limit for metadata object storage. In response, the server 102 can determine which metadata object(s) to remove from the first memory device 110 to free up space for additional metadata-object storage. In some examples, the server 102 determines that the first number of extents corresponding to the first data unit 132 is less that the second number of extents corresponding to the second data unit 134. The server 102 can determine the first number of extents by accessing the first metadata object 112, which can indicate the locations and amount of extents in the first set of extents 122. Similarly, the server 102 can determine the second number of extents by accessing the second metadata object 114, which can indicate the locations and amount of extents in the second set of extents 124. If the first data unit 132 is the same size as the second data unit 134, then the first metadata object 112 is more dense than the second metadata object 114. Based on the first metadata object 112 being more dense than the second metadata object 114, the server 102 can remove the second metadata object 114 from the first memory device 110. The server 102 can also maintain the first metadata object 112 in the first memory device 110, based on determining that the first metadata object 112 is more dense than the second metadata object 114.

To determine which of the metadata objects to remove from the first memory device 110, in some examples the server 102 can assign each metadata object to a category and determine the metadata object(s) to remove based on the category. In some examples, the categories can be assigned based on the density of the metadata object. There may be a category for each density, or a category can corresponding to a range of densities. For example, the server 102 can assign the first metadata object 112 to a first category based on the density of the first metadata object 112. The server 102 can assign the second metadata object 114 to a second category based on the density of the second metadata object 114. The server 102 can also assign a third metadata object 116 to the second category based on the density of the third metadata object 116.

In some examples, the categories can be assigned based on the number of extents specified in the corresponding metadata object. There may be a category for each number of extents, or a category can encompass a range of numbers of extents. As one particular example, metadata objects specifying 1-10 extents may be assigned to a first category, metadata objects specifying 11-20 extents may be assigned to a second category, and metadata objects specifying 21-30 extents may be assigned to a third category. In one particular example, the first memory device 110 can include a third metadata object 116 specifying locations of a third set of extents 126 corresponding to a third data unit 136 stored in the second memory device 120. The server 102 can assign the first metadata object 112 to a first category based on a first number of extents in the first set of extents 122. The server 102 can assign the second metadata object 114 to a second category, which is different than the first category, based on a second number of extents in the second set of extents 124. And the server 102 can assign the third metadata object 116 to the second category based on a third number of extents in the third set of extents 126.

In some examples, the first memory device 110 includes a data structure 140 (e.g., lookup table or hash table) that stores associations between metadata objects and respective categories. For example, the server 102 can assign the first metadata object 112 to the first category by storing a first association 142 between the first metadata object 112 and the first category in the data structure 140. The server 102 can also assign the second metadata object 114 to the second category by storing a second association 144 between the second metadata object 114 and the second category in the data structure 140. A third association 146 between the third metadata object 116 and the second category can be stored in the data structure 140 assigning the third metadata object 116 to the second category.

Once categorized, the server 102 can then determine one or more metadata objects to remove from within one or more of the categories using an algorithm, such as a least recently used (LRU) algorithm 150 or a least frequently used (LFU) algorithm. The algorithm may be executed on one or multiple categories at a time. For example, the server 102 can execute an LRU algorithm 150 for the second category and determine the third metadata object 116 was accessed more recently than the second metadata object 114. As a result, the server 102 can remove the second metadata object 114 from the first memory device 110 and maintain the third metadata object 116 in the first memory device 110. In this way, the server 102 can first categorize the metadata objects by number of extents and/or density, and then apply the algorithm to one or more of the categories (e.g., the category associated with the least dense metadata-objects), to determine which metadata object(s) to remove from the first memory device 110.

In some examples, the server 102 includes conditions associated with the algorithm. The conditions may include a timing function for executing the algorithm and/or a number of metadata objects to remove from a particular category. For example, the conditions may specify that the algorithm is to be executed on a category that includes the most metadata objects. Alternatively, the conditions may specify that the algorithm is to be executed for a first category when a first additional read request is received and on a second category when a second additional read request is received. The conditions may include a number of read requests (e.g., five) to be received from the client device 104 between executions of the algorithm on a particular category. With regards to the number of metadata objects to remove from the particular category, the conditions may specify that fewer metadata objects should be removed from categories corresponding to higher numbers of extents (e.g., more dense metadata-objects) than categories corresponding to lower numbers of extents (e.g., less dense metadata-objects).

While the example shown in FIG. 1 depicts a specific number and arrangement of components for simplicity, other examples may include more components, fewer components, different components, or a different arrangement of the components shown in FIG. 1. For instance, the second memory device 120 may be included in the server 102 in other examples. And although the system 100 depicts a client-server architecture, in some examples the principles described herein can be implemented locally on a computing device based on read requests from software executing locally on the computing device (e.g., rather than based on read requests from an external client device 104). Additionally, the data structure 140 may be stored elsewhere than in the first memory device 110 in other examples.

Figure 2:
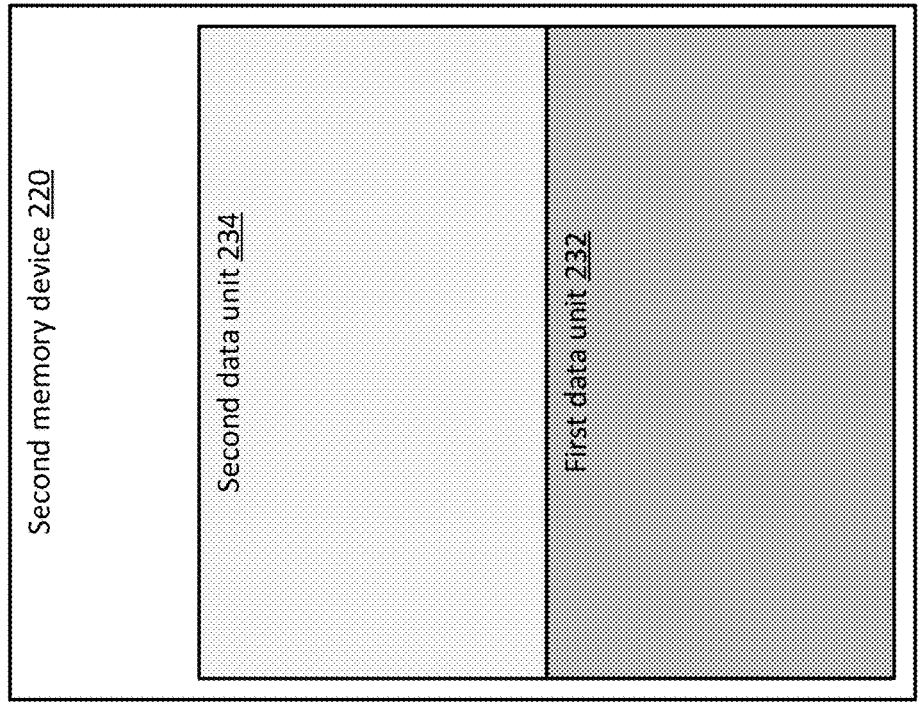
FIG. 2 is a diagram of metadata objects describing data units according to some aspects of the present disclosure.
Figure 2:
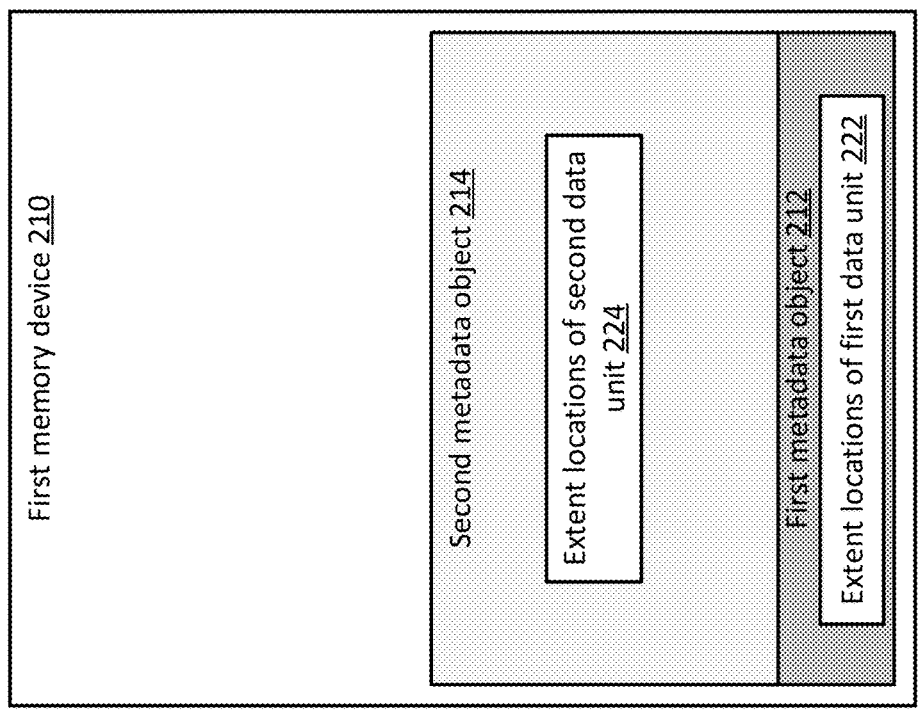

FIG. 2 is a diagram of an example of metadata objects stored in a first memory device 210 describing data units stored in a second memory device 220 according to some aspects of the present disclosure. The first memory device 210 stores a first metadata object 212 and a second metadata object 214. The first metadata object 212 specifies extent locations of a first data unit 222. The second metadata object 214 specifies extent locations of a second data unit 224. The second memory device 220 stores a first data unit 232 and a second data unit 234 in respective extent locations specified by the first metadata object 212 and the second metadata object 214.

Although the first metadata object 212 is smaller in size than the second metadata object 214 in the first memory device 210, the first data unit 232 and the second data unit 234 can be the total same size (e.g., 4 MB) in the second memory device 220. The first metadata object 212 can be smaller in size than the second metadata object 214 because the first data unit 232 spans fewer non-continuous extents than the second data unit 234, such that less metadata information is present in the first metadata object 212 than in the second metadata object 214. As a result, the first metadata object 212 may be considered to be more dense than the second metadata object 214. It may be advantageous to remove the second metadata object 214 from the first memory device 210 when the first memory device 210 is full, since the first metadata object 212 is more dense and therefore uses less space in the first memory device 210 to describe the same amount of data stored on the second memory device 220 than the second metadata object 214.

Figure 3:
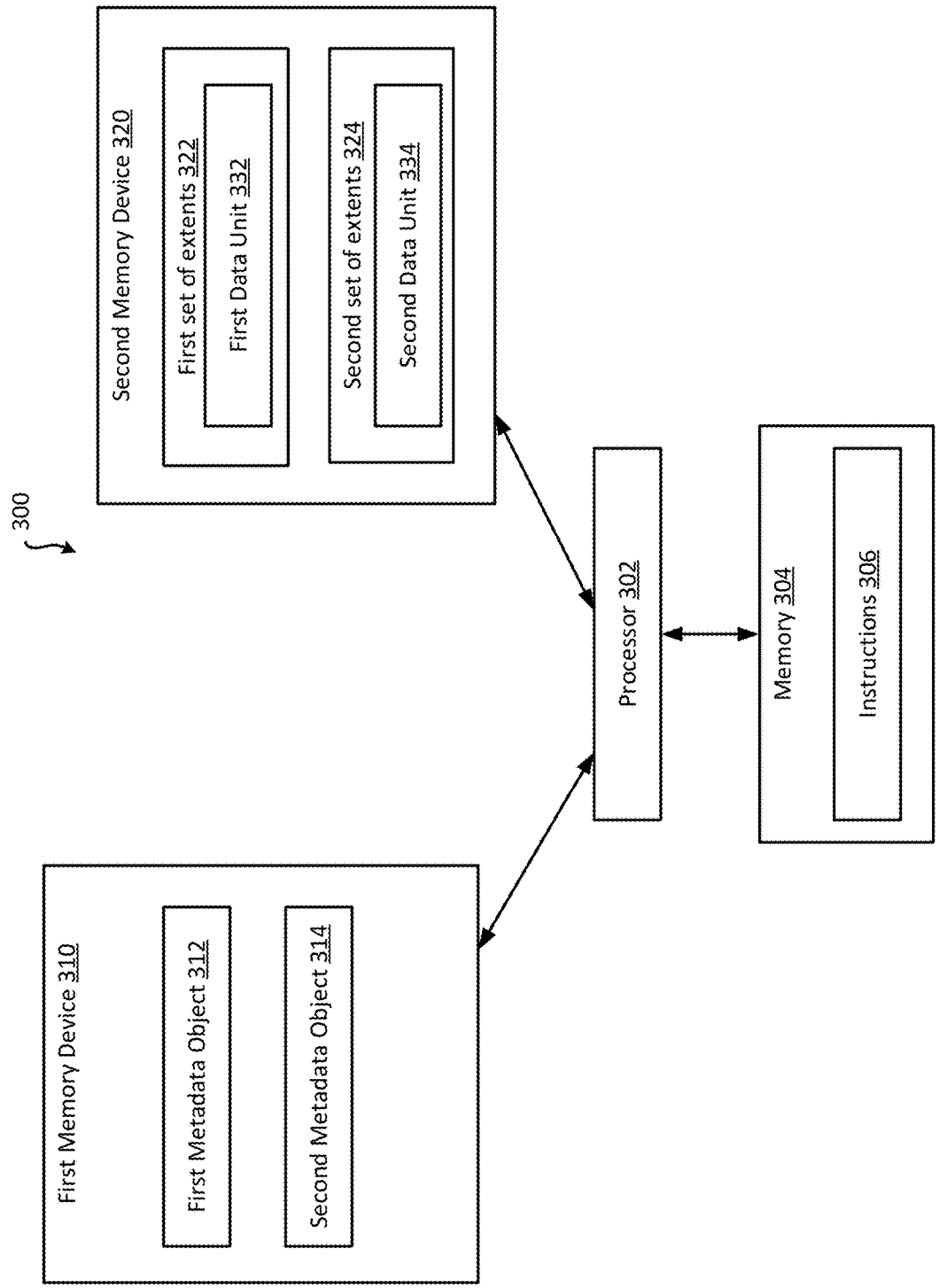
FIG. 3 is a block diagram of another example of a system for metadata management in an extent-based storage system according to some aspects of the present disclosure.

FIG. 3 is a block diagram of another example of a system 300 for implementing metadata management in an extent-based storage system according to some aspects of the present disclosure. The system 300 includes a processor 302 communicatively coupled with a memory 304. In some examples, the processor 302 and the memory 304 can be included in the same housing and form part of the same computing device, such as the server 102 of FIG. 1. In other examples, the processor 302 and the memory 304 can be distributed from (e.g., remote to) one another.

The processor 302 can include one processor or multiple processors. Non-limiting examples of the processor 302 include a Field-Programmable Gate Array (FPGA), an application-specific integrated circuit (ASIC), a microprocessor, etc. The processor 302 can execute instructions 306 stored in the memory 304 to perform operations. In some examples, the instructions 306 can include processor-specific instructions generated by a compiler or an interpreter from code written in any suitable computer-programming language, such as C, C++, C#, etc.

The memory 304 can include one memory or multiple memories. The memory 304 can be non-volatile and may include any type of memory that retains stored information when powered off. Non-limiting examples of the memory 304 include electrically erasable and programmable read-only memory (EEPROM), flash memory, or any other type of non-volatile memory. In some examples, at least some of the memory can include a medium from which the processor 302 can read instructions 306. A computer-readable medium can include electronic, optical, magnetic, or other storage devices capable of providing the processor 302 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 306.

In some examples, the processor 302 can execute instructions 306 to perform various operations. For example, the processor 302 can store, in a first memory device 310, a first metadata object 312 specifying a first set of extents 322 corresponding to a first data unit 332 in a second memory device 320. Additionally, the processor 302 can store, in the first memory device 310, a second metadata object 314 specifying a second set of extents 324 corresponding to a second data unit 334 in the second memory device 320. The processor 302 can determine that a first size of the first metadata object 312 is smaller than a second size of a second metadata object 314. The processor 302 can then remove the second metadata object 314 from the first memory device 310 based on the first size being smaller than the second size.

In some examples, the processor 302 may additionally determine that a size of the first data unit 332 is the same as the size of the second data unit 334. As a result, the processor 302 can determine that the first metadata object 312 is more dense than the second metadata object 314. The processor 302 can then remove the second metadata object 314 from the first memory device 310 based on the first metadata object 312 being more dense than the second metadata object 314.

In some examples, the processor 302 can execute an algorithm to determine which metadata object to remove from the first memory device 310. For example, the processor 302 may assign the first metadata object 312 and the second metadata object 314 to categories based on the sizes or densities of the metadata objects. The processor 302 can then execute the algorithm with respect to the metadata objects assigned to one of the categories. For example, the processor 302 can remove, from the first memory device 310, whichever metadata object was accessed least recently among all of the metadata objects assigned to a particular category.

Figure 4:
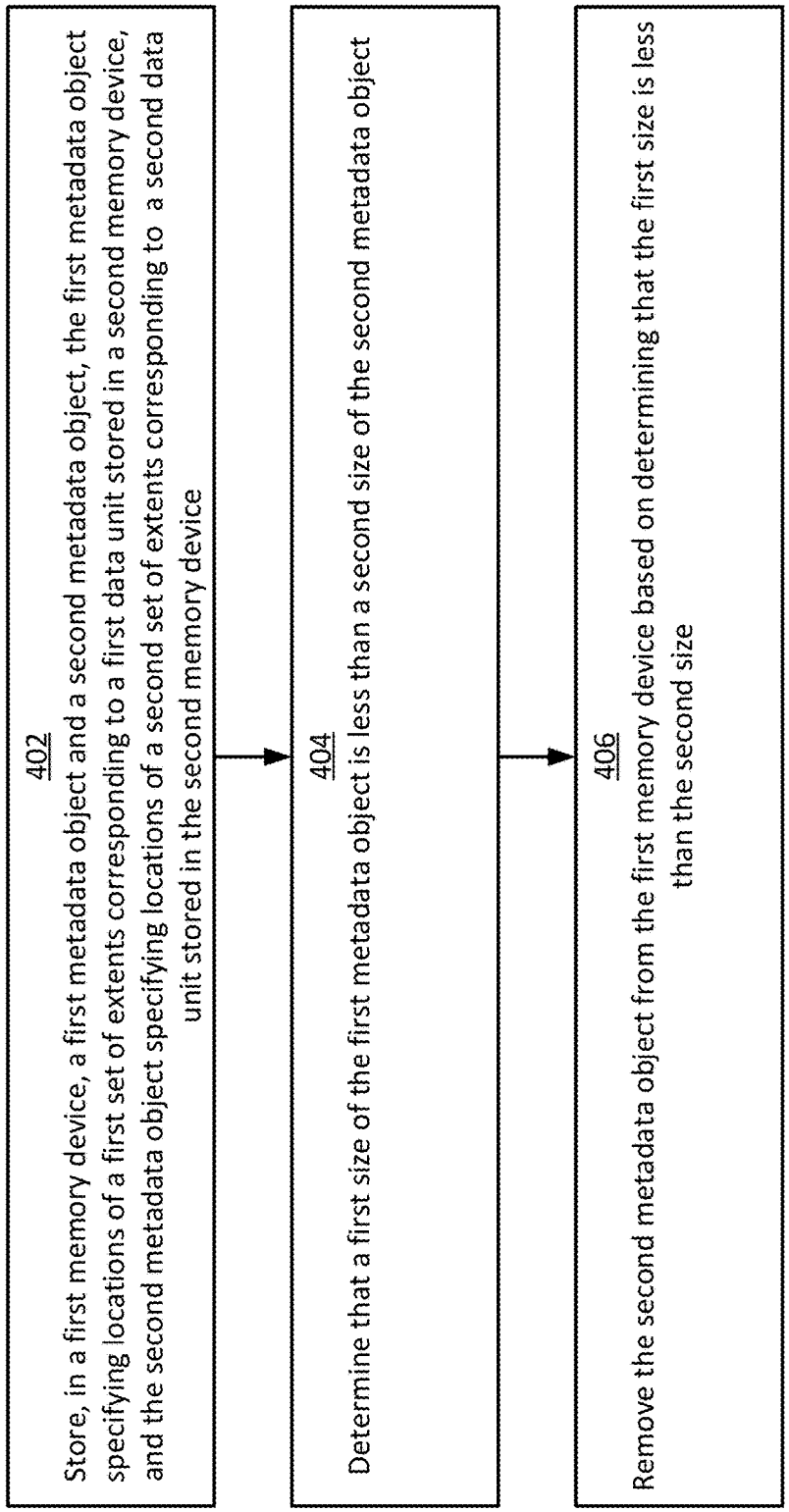
FIG. 4 is a flow chart of an example of a process for metadata management in an extent-based storage system according to some aspects of the present disclosure.

In some examples, the processor 302 can implement some or all of the steps shown in FIG. 4. Other examples can include more steps, fewer steps, different steps, or a different order of the steps than is shown in FIG. 4. The steps of FIG. 4 are discussed below with reference to the components discussed above in relation to FIG. 3.

In block 402, a processor 302 stores a first metadata object 312 and a second metadata object 314 in a first memory device 310. The first metadata object 312 can specify locations of a first set of extents 322 corresponding to a first data unit 332 stored in a second memory device 320. The second metadata object 314 can specify locations of a second set of extents 324 corresponding to a second data unit 334 stored in the second memory device 320.

In block 404, the processor 302 determines that a first size of the first metadata object 312 is less than a second size of the second metadata object 314. Based on determining the first size is less than the second size, the processor 302 may determine that the first metadata object 312 is more dense than the second metadata object 314.

In block 406, the processor 302 removes the second metadata object 314 from the first memory device 310 based on determining that the first size is less than the second size. The processor 302 additionally maintains the first metadata object 312 in the first memory device 310.

In some examples, the processor 302 can assign metadata objects in the first memory device 310 to categories based on their size (e.g., based on their density which in turn is based on their size). The processor 302 may execute a LRU algorithm or another type of algorithm for removing metadata objects from the first memory device 310 based on the sizes of the metadata objects. The algorithm may be executed on one or more categories at a time to determine one or more metadata objects to remove from the first memory device 310.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A system comprising:
a processor; and
a memory including instructions that are executable by the processor for causing the processor to:
store, in a first memory device, a first metadata object and a second metadata object, the first metadata object specifying locations of a first set of extents corresponding to a first data unit stored in a second memory device, and the second metadata object specifying locations of a second set of extents corresponding to a second data unit stored in the second memory device;

determine a first size of the first metadata object and a second size of the second metadata object;

determine a third size of the first data unit and a fourth size of the second data unit;

determine that the second metadata object is to be removed from the first memory device based on the first size, the second size, the third size, and the fourth size; and in response to determining that the second metadata object is to be removed from the first memory device, remove the second metadata object from the first memory device.

2. The system of claim 1, wherein the memory further includes instructions that are executable by the processor for causing the processor to maintain the first metadata object in the first memory device based on the first size is being less than the second size.

3. The system of claim 1, wherein the first memory device includes a third metadata object specifying locations of a third set of extents corresponding to a third data unit stored in the second memory device, and wherein the memory further includes instructions that are executable by the processor for causing the processor to:

assign the first metadata object to a first category based on the first size;

assign the second metadata object to a second category based on the second size, the second category being different from the first category;

assign the third metadata object to the second category based on a fifth size of the third metadata object;

determine that the third metadata object was accessed more recently or more frequently than the second metadata object; and remove the second metadata object from the first memory device and maintain the third metadata object in the first memory device, based on determining that the third metadata object is assigned to the second category and was accessed more recently or more frequently than the second metadata object.

4. The system of claim 3, wherein the memory further includes instructions that are executable by the processor to cause the processor to:

assign the first metadata object to the first category by storing a first association between the first metadata object and the first category in a data structure;

assign the second metadata object to the second category by storing a second association between the second metadata object and the second category in the data structure; and assign the third metadata object to the second category by storing a third association between the third metadata object and the second category in the data structure.

5. The system of claim 1, wherein the memory further includes instructions that are executable by the processor to cause the processor to:

determine that the first data unit and the second data unit are of the same size in the second memory device; and remove the second metadata object from the first memory device based on (i) the first size being less than the second size, and (ii) the first data unit and the second data unit being the same size.

6. The system of claim 1, further comprising the first memory device and the second memory device, wherein the second memory device is slower in speed than the first memory device.

7. The system of claim 1, wherein the first metadata object and the second metadata object include location information for retrieving the first data unit and the second data unit, respectively, from the second memory device.

8. The system of claim 1, wherein the memory further includes instructions that are executable by the processor to cause the processor to remove metadata objects from the first memory device based on densities of the metadata objects and a least recently used (LRU) algorithm, the densities of the metadata objects being computed based on the sizes of the metadata objects and the sizes of data units corresponding to the metadata objects.

9. A method comprising:

storing, by a processor and in a first memory device, a first metadata object and a second metadata object, the first metadata object specifying locations of a first set of extents corresponding to a first data unit stored in a second memory device, and the second metadata object specifying locations of a second set of extents corresponding to a second data unit stored in the second memory device;

determining, by the processor, a first size of the first metadata object and a second size of the second metadata object;

determine, by the processor, a third size of the first data unit and a fourth size of the second data unit;

determining, by the processor, that the second metadata object is to be removed from the first memory device based on the first size, the second size, the third size, and the fourth size; and in response to determining that the second metadata object is to be removed from the first memory device, removing, by the processor, the second metadata object from the first memory device.

10. The method of claim 9, further comprising maintaining the first metadata object in the first memory device based on the first size being less than the second size.

11. The method of claim 9, wherein the first memory device includes a third metadata object specifying locations of a third set of extents corresponding to a third data unit stored in the second memory device, and the method further comprises:

assigning the first metadata object to a first category based on the first size;

assigning the second metadata object to a second category based on the second size, the second category being different from the first category;

assigning the third metadata object to the second category based on a fifth size of the third metadata object;

determining that the third metadata object was accessed more recently or more frequently than the second metadata object; and removing the second metadata object from the first memory device and maintain the third metadata object in the first memory device, based on determining that the third metadata object is assigned to the second category and was accessed more recently or more frequently than the second metadata object.

12. The method of claim 11, further comprising:

assigning the first metadata object to the first category by storing a first association between the first metadata object and the first category in a data structure;

assigning the second metadata object to the second category by storing a second association between the second metadata object and the second category in the data structure; and assigning the third metadata object to the second category by storing a third association between the third metadata object and the second category in the data structure.

13. The method of claim 9, further comprising:
   determining that the first data unit and the second data unit are of the same in the second memory device; and
   removing the second metadata object from the first memory device based on determining that (i) the first size is less than the second size, and (ii) the first data unit and the second data unit are of the same size.

14. The method of claim 9, wherein the second memory device is slower in speed than the first memory device.

15. The method of claim 9, wherein the first metadata object and the second metadata object include location information for retrieving the first data unit and the second data unit, respectively, from the second memory device.

16. The method of claim 9, further comprising removing metadata objects from the first memory device based on densities of the metadata objects and a least recently used (LRU) algorithm.

17. A non-transitory computer-readable medium comprising program code that is executable by a processor for causing the processor to:
   store, in a first memory device, a first metadata object and a second metadata object, the first metadata object specifying locations of a first set of extents corresponding to a first data unit stored in a second memory device, and the second metadata object specifying locations of a second set of extents corresponding to a second data unit stored in the second memory device;
   determine a first size of the first metadata object and a second size of the second metadata object;
   determine a third size of the first data unit and a fourth size of the second data unit;
   determine that the second metadata object is to be removed from the first memory device based on the first size, the second size, the third size, and the fourth size; and
   in response to determining that the second metadata object is to be removed from the first memory device, remove the second metadata object from the first memory device.

18. The non-transitory computer-readable medium of claim 17, wherein the first memory device includes a third metadata object specifying locations of a third set of extents corresponding to a third data unit stored in the second memory device, and wherein the non-transitory computer-readable medium further includes program code that is executable by the processor for causing the processor to:
   assign the first metadata object to a first category based on the first size;
   assign the second metadata object to a second category based on the second size, the second category being different from the first category;
   assign the third metadata object to the second category based on a fifth size of the third metadata object;
   determine that the third metadata object was accessed more recently or more frequently than the second metadata object; and
   remove the second metadata object from the first memory device and maintain the third metadata object in the first memory device, based on determining that the third metadata object is assigned to the second category and was accessed more recently or more frequently than the second metadata object.

19. The non-transitory computer-readable medium of claim 18, wherein the non-transitory computer-readable medium further includes program code that is executable by the processor to cause the processor to:
   assign the first metadata object to the first category by storing a first association between the first metadata object and the first category in a data structure;
   assign the second metadata object to the second category by storing a second association between the second metadata object and the second category in the data structure; and
   assign the third metadata object to the second category by storing a third association between the third metadata object and the second category in the data structure.

20. The non-transitory computer-readable medium of claim 17, wherein the non-transitory computer-readable medium further includes program code that is executable by the processor to cause the processor to:
   determine that the first data unit and the second data unit are of the same size in the second memory device; and
   remove the second metadata object from the first memory device based on determining that (i) the first size is less than the second size, and (ii) the first data unit and the second data unit are of the same size.

* * * * *